United States Patent [19]

Cambiano

[11] Patent Number: 4,645,405
[45] Date of Patent: Feb. 24, 1987

[54] ROLL-OFF CONTAINER HANDLING MECHANISM

[76] Inventor: Angelo M. Cambiano, 1015 NE. 97th Pl., Kansas City, Mo. 64155

[21] Appl. No.: 729,284

[22] Filed: May 1, 1985

[51] Int. Cl.⁴ .............................................. B60P 1/28
[52] U.S. Cl. .................................. 414/494; 414/480; 414/500
[58] Field of Search ............................... 414/477–480, 414/491, 494, 498, 500, 506

[56] References Cited

U.S. PATENT DOCUMENTS

| | | | |
|---|---|---|---|
| 3,049,378 | 8/1962 | Nelson | 414/500 X |
| 3,074,574 | 1/1963 | Prince | 414/477 |
| 3,077,278 | 2/1963 | Alexander | 414/494 |
| 3,138,276 | 6/1964 | Allen et al. | 414/491 |
| 3,159,295 | 12/1964 | Love | 414/494 |
| 3,964,626 | 6/1976 | Arregui | 414/480 |
| 4,109,810 | 8/1978 | Jones | 414/477 |
| 4,133,439 | 1/1979 | Goranson | 414/494 |
| 4,133,439 | 1/1979 | Goranson | 414/494 |
| 4,165,007 | 8/1979 | Brown | 414/494 |
| 4,455,118 | 6/1984 | Scharf | 414/494 |
| 4,529,349 | 7/1985 | Lutz | 414/494 X |

FOREIGN PATENT DOCUMENTS 229723  3/1925  United Kingdom ................ 414/480

Primary Examiner—Joseph E. Valenza
Assistant Examiner—David A. Bucci
Attorney, Agent, or Firm—Litman, Day & McMahon

[57] ABSTRACT

A handling mechanism for roll-off containers includes an elongated lift frame pivotally connected to a truck chassis, hydraulic tilt rams connected between the lift frame and the chassis, a slide member mounted in tracks along the lift frame, a stationary pulley mounted on the lift frame for rotation in a vertical plane, a movable pulley mounted on the slide member for rotation in a vertical plane, and a pair of container lift rams mounted along the lift frame and connected to the slide member. A cable is connected to the side member, is reeved about the stationary pulley and the movable pulley, and extends to the rear for connection to a container. The lift frame is tilted up and back for loading and off-loading the container. For transportation, the lift frame is tilted to horizontal.

5 Claims, 5 Drawing Figures

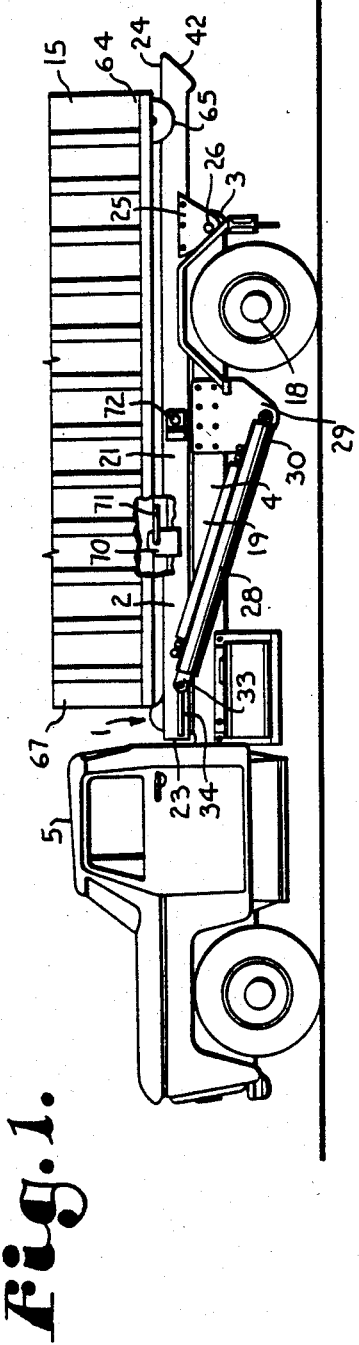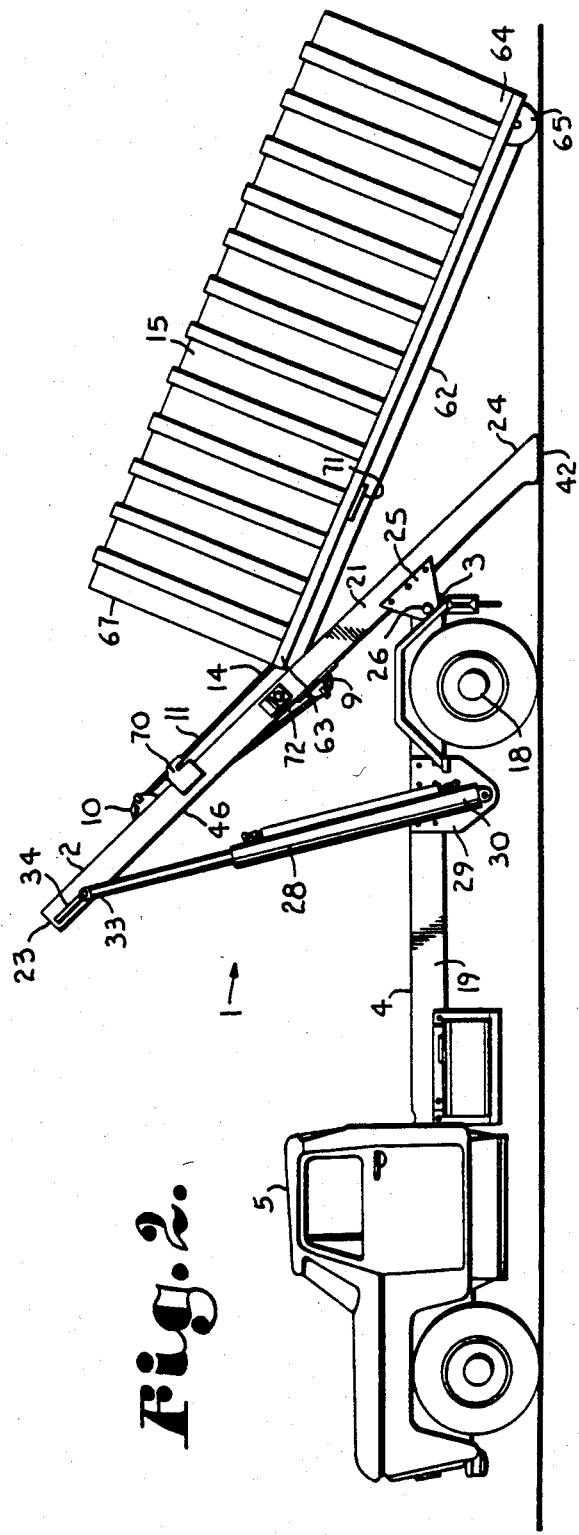

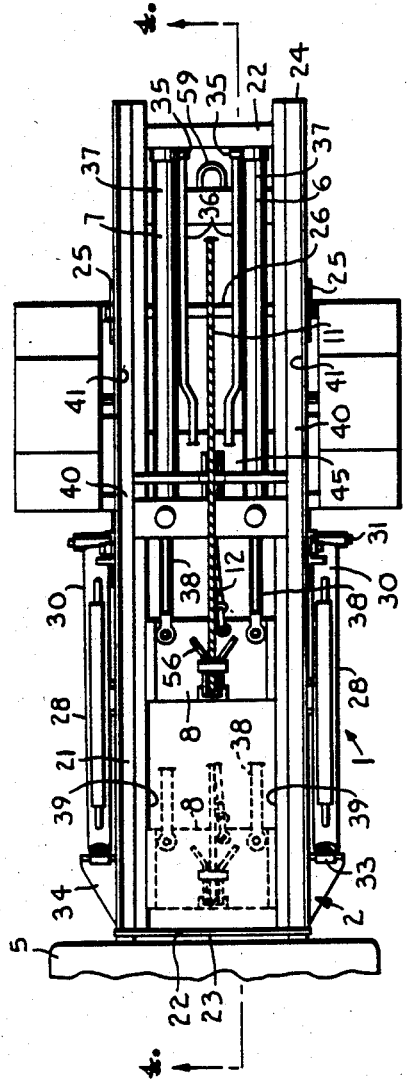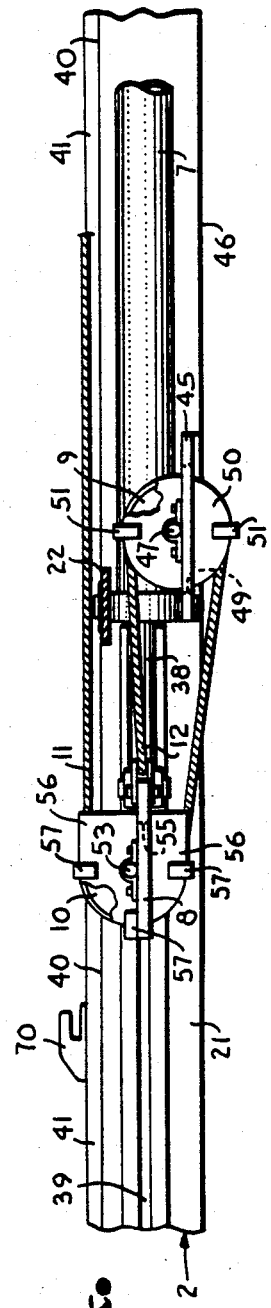

ROLL-OFF CONTAINER HANDLING MECHANISM

FIELD OF THE INVENTION

The present invention relates to large container handling equipment and, more particularly, to an improved roll-off container handling mechanism.

BACKGROUND OF THE INVENTION

In order to better utilize trucking equipment, truck bodies which can be disconnected and later reconnected to the truck were developed. By this means, the truck as a whole and the driver need not be tied up waiting for the truck to be filled or emptied. Such methods have been used for many years with tractor-trailer types of trucks since the trailer may simply be separated from the tractor and reattached as needed. One disadvantage of the tractor-trailer approach is that each trailer has to be equipped with axles, tires, brakes, and lights. However, the expense of these accessories is justified by the large loads that can be carried. Where smaller loads are involved, it has not been found economical to either provide smaller trailers or to carry smaller loads in or on full sized trailers. Thus, trucks with off-loadable containers have been provided for such smaller loads.

One system for handling such smaller loads which has found wide acceptance is the so-called roll-off arrangement. In a roll-off container arrangement, a solid (or non-trailer) truck chassis has a hydraulically tiltable frame and usually a cable system for drawing the container onto the tilt frame and off-loading the container. Either the tilt frame, the container, or both have rollers and guide tracks to facilitate movement of the container on the frame. The tilt frame is tilted up and back for container loading and is positioned horizontally for transportation of the container. Originally, drum winches were employed for movement of the cable connected to the container. However, it was found that friction and pressure between portions of the cable on the drum was destructive to the cable which, therefore, had to be replaced too frequently. To overcome this problem, lifting arrangements employing linear hydraulic motors or rams and pulleys were developed.

Linear motor roll-off arrangements usually employ multiple pulleys to multiply the travel rate of the cable for a given ram stroke length. This allows shorter rams which economizes the mechanism in a number of ways, including: lower initial cost for the ram or rams and the hydraulic fluid reservoir since less fluid is required to fully extend the shorter cylinders. In order to conserve space on these mechanisms when multiple pulleys are employed, it has been the usual practice to orient all but the final pulley for rotation in approximately the same plane as the tilt frame. That is, when the frame is tilted to horizontal, the pulleys are rotating in a horizontal plane. The final pulley before the cable connects to the container, is usually oriented for rotation in a vertical plane.

One problem with the horizontally oriented pulleys is that when the cable is in a slack condition and not tensioned about the pulleys, the cable tends to slip off the pulleys under the influence of gravity and, possibly, jolts and vibrations. If the cable slips off the pulleys, it might become caught or wedged in other portions of the mechanism. The only solution then is to manually re-reeve the cable properly about the pulleys. Even if the cable is not caught in this manner, there is the possibility of frictional damage to the cable by scraping against portions of the mechanism as it is tensioned.

The transition of the cable from a horizontally oriented pulley to the final vertically oriented pulley places side loads on these pulleys which can result in binding and accelerated wear of their bearings.

SUMMARY OF THE INVENTION

The present invention provides an improved cable handling arrangement for a ram actuated roll-off container handling mechanism. In the present invention, multiple pulleys are provided to multiply the cable travel rate for a given ram stroke length. All of the pulleys are positioned for rotation about horizontal axes, that is, for rotation in vertical planes. At least one of the pulleys is mounted stationarily on the lift or tilt frame. At least one other pulley is mounted on a slide member connected to a lift ram or, preferably, a pair of lift rams. The stationary pulley is mounted near a lower side of the tilt frame while the movable pulley is mounted near an upper side of the frame. In this way, the pulleys are staggered vertically somewhat to prevent interference between portions of the cable. The vertical orientation of the pulleys insures that the cable portions are always urged by gravity to remain on the pulleys, even in a slack condition of the cable, whereby the useful life of the cable is lengthened. In addition, the placement of both pulleys in approximately the same vertical plane assures that no side loads are placed on the pulleys which increases their useful life as well.

OBJECTS OF THE INVENTION

The principal objects of the present invention are: to provide an improved mechanism for loading and unloading temporary truck bodies such as large open top containers; to provide such a mechanism of the type including a tilting lift frame on a truck chassis, a hydraulic container lift ram, and a cable connected to the container and engaging the ram such that extension or retraction of the ram loads or unloads the container with respect to the lift frame; to provide such a mechanism which extends the useful life of the cable used on such a mechanism by reducing the instances of mutual frictional contact between portions of the cable and frictional contact between the cable and other members of the mechanism; to provide such a mechanism which facilitates the operation of pulleys in the system by applying loads thereto only in the plane of the pulleys; to provide such a mechanism wherein the length of cable moved by the ram is a multiple of the length of movement of the ram piston; to provide such a mechanism wherein the cable is urged by gravity onto the pulleys supporting the cable such that there is less tendency for the cable to slip off the pulleys and contact other members of the mechanism when the cable is in a slack condition; to provide such a mechanism including two cable pulleys mounted for rotation in a vertical plane, one of the pulleys being mounted on a slide member connected to the container lift rams and the other being mounted on the lift frame, and the cable being connected to the slide member and reeved about the stationary and movable pulleys and extending to the rear; and to provide such a mechanism which is economical to manufacture, positive and durable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a fragmentary side elevational view of a truck on which is installed a roll-off container handling mechanism according to the present invention, with a lift frame thereof shown in a horizontal transport position.

FIG. 2 is a view similar to FIG. 1 and shows the lift frame in a tilted position for loading a container onto the frame or unloading the container therefrom.

FIG. 3 is a fragmentary plan view of the mechanism with the lift frame shown in the transport position and with an extended position of a slide member shown in phantom lines.

FIG. 4 is an enlarged fragmentary longitudinal sectional view of the lift mechanism taken on line 4—4 of FIG. 3 and showing the slide member in a fully retracted position.

FIG. 5 is a view similar to FIG. 4 and illustrates the slide member in an extended position on the lift frame with a portion of the container broken away to show the connection of the cable to the container.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a roll-off container handling mechanism according to the present invention. The mechanism 1 includes a tilting lift frame 2 pivotally connected to the rear end 3 of the chassis 4 of a truck 5. A pair of laterally spaced hydraulic lift cylinders or rams 6 and 7 (FIG. 3) are mounted on the frame 2 and have the pistons thereof connected to a slide member 8 which is mounted for sliding along the lift frame 2. A stationary pulley 9 is mounted on the frame 2, and a movable pulley 10 is mounted on the slide member 8. The pulleys 9 and 10 are positioned for rotation in a vertical plane. A cable 11 has a first end 12 connected to the slide member 8 and a second end 14 for connection to a container 15. Between the ends 12 and 14, the cable 11 is reeved about the pulleys 9 and 10. Upon extension of the rams 6 and 7, the container 15 is drawn onto the uptilted frame 2. Retraction of the rams 6 and 7 allows the container 15 to descend the frame 2 for off-loading of same.

The truck 5 is conventional and is preferably of the solid chassis type wherein the chassis 4 is a part of the frame structure of the truck rather than a trailer for the truck 5. The truck 5 may include a single rear axle 18 or may include a double axle depending upon the weight of the container 15 and the payload to be carried therein. The chassis 4 includes laterally spaced side members 19 which are joined in a conventional manner to support the weight of the truck 5 and the accessories and payload carried thereby.

The tilting lift frame 2 is formed by elongated side members or rails 21 joined in laterally spaced relation by cross members 22 (FIG. 3) positioned along the frame 2 between a front end 23 of the frame 2 and a rear end 24 thereof. The illustrated lift frame 2 is connected to the rear end 3 of the chassis 4 by lugs 25 which depend from the rails 21 near the rear end 24 of the frame 2. A pivot axle 26 passes through aligned apertures (not shown) in the lugs 25 and in the side members 19 of the chassis 4. The lift frame 2 is tilted by operation of a pair of hydraulic tilt rams 28 pivotally connected respectively between the side members 19 of the chassis 4 and the side rails 21 of the frame 2. As illustrated, the chassis 4 includes extensions 29 depending therefrom to which the lower or cylinder ends 30 of the tilt rams 28 are connected as by a pivot rod 31 extending between and protruding outwardly from the extensions 29. The upper or piston ends 33 of the rams 28 are pivotally connected to the rails 21 of the frame 2 near the front end 23 thereof. The illustrated pivot points for the piston ends 33 are in the form of gussets 34 which are oriented to withstand the substantially forward thrust of the tilt rams 28. As the rams 28 extend and retract to tilt the frame 2, the rams pivot therewith.

The lift rams 6 and 7 are mounted on the lift frame 2 adjacent the rails 21 near the rear end 24 of the frame 2. While it would be possible to operate the mechanism 1 with a single container lift ram, two are preferred for more balanced movement of the slide member 8 without binding and for lower required hydraulic pressure for a given diameter of ram. Preferably, the rams 6 and 7 are oriented such that the hydraulic connections 35 and hoses 36 are positioned between the rams. In this orientation, the connections 35 and hoses 36 are less vulnerable to damage by portions of the container 15 or objects such as refuse extending from the container as it is loaded onto the frame 2. The cylinder ends 37 of the rams 6 and 7 are stationary and are attached to the frame 2 while the piston ends 38 are connected to the slide member 8. The lift rams 6 and 7, as well as the tilt rams 28, are preferably single stage, double acting hydraulic rams. Telescoping hydraulic rams, which are more expensive to purchase and more difficult to maintain, are not required in the mechanism 1. The slide member 8 is positioned in guide tracks 39 which extend along the inner surface of the rails 21. The rails 21 have upper surfaces 40 which support the container 15 when loaded onto the frame 2 and upstanding outer flanges 41 which, in cooperation with the surface 40, function as tracks to guide the container 15 onto and off the frame 2. The extreme rear ends 24 of the rails include undercut angled surfaces 42 such that when the frame 2 is tilted up, the upper surfaces 40 of the rails are positioned as close as possible to the ground surface to thereby facilitate starting the container 15 onto the rails 21.

Referring to FIGS. 4 and 5, the stationary pulley 9 is mounted at the longitudinal centerline of the frame 2 about halfway therealong. A plate 45 forming part of one of the cross members 22, is positioned at a lower side 46 of the frame 2. A laterally positioned axle 47 is mounted on an upper side of the plate 45 and has the stationary pulley 9 rotatably positioned thereon. The pulley 9 is positioned in a slot 49 in the plate 45, and an upper periphery of the pulley protrudes above the plate 45 with a lower periphery extending below the plate 45 and the lower side 46 of the frame 2. Preferably side shields 50 extend above and below the plate 45 and help to stiffen the plate 45 which would otherwise be weakened somewhat by the slot 49 in which the pulley 9 is positioned. The shields 50 include guard bars 51 extending therebetween which increase their rigidity and which help retain the cable 11 on the pulley 9 when first installed and when in a slack position.

The movable pulley 10 is positioned in a slot 55 at the front of the slide member 8 in a manner similar to the mounting of the stationary pulley 9 on the plate 45. A laterally positional axle 53 rotatably supports the pulley 10 on the upper side of the slide member 8 with an upper periphery and a lower periphery protruding respectively above and below the slide member 8. Side shields 56 with guard bars 57 extending therebetween are positioned on opposite sides of the slot 55 and the pulley 10 and perform similar functions as the shields 50 and bars 51.

The first end 12 of the cable 11 is connected to the slide member 8 at the rear end thereof. The cable 11 extends rearwardly, is threaded or reeved around the stationary pulley 9 from the upper periphery to the lower periphery, and from there extends forwardly to the movable pulley 10. The cable is reeved about the movable pulley 9 from the lower periphery to the upper periphery and extends from there toward the rear for connection of the second end 14 of the cable 11 to the container 15. Preferably, a cable end retainer loop 59 is provided near the rear end 24 of the lift frame 2 for connection of the free end 14 of the cable thereto when not connected to a container 15 to prevent damage to the cable 11.

The combination of the two pulleys 9 and 10 and the manner in which the cable 11 is reeved about them results in a three-to-one ratio between the length of movement of the cable and the length of extension or retraction of the lift rams 6 and 7. The cable travel multiplication arrangement allows the use of shorter lift rams 6 and 7 than would otherwise be possible. It would be possible to increase the cable travel-to-ram extension ratio by replacing each of the pulleys 9 and 10 with multiple pulleys. However, there is a limit to how much the cable travel can be multiplied without adversely affecting the weight lifting capacity of the mechanism 1. The cable and pulley arrangement in the mechanism 1 functions as a block and tackle system in reverse. In a conventional block and tackle arrangement, the load to be lifted is connected to the movable pulley set, and the lifting force is applied to the free end of the cable. In this way, the load displacement is a fraction of cable travel such that the lifting force to load weight is multiplied. In the mechanism 1, however, the weight to be lifted is connected to the free end 14 of the cable while the lifting force is applied to the movable pulley 10 through the slide member 8. Therefore, the cable displacement is a multiple of the lift ram displacement, and it follows that the load lifting capacity is diminished by the same factor or multiple. In addition, increasing the number of pulleys in the mechanism also increases the length of cable required in the system.

The container 15 may be any type of container of compatible length and weight for a frame and chassis which includes accessories as will be detailed below. Such containers are commonly employed for receiving and/or compacting trash or refuse and may be either open topped or fully enclosed. The container 15 includes a pair of skid rails 62 (FIG. 2) which are spaced apart to mate with the tracks formed by the upper surfaces 40 and flanges 41 of the frame side rails 21. The skids 62 are preferably rounded at the front ends 63 thereof for non-damaging initial contact with the frame rails 21. The lower rear ends 64 of the container 15 are provided with rollers 65 to facilitate movement of the container after the front end has been lifted. A recess 66 (FIG. 5) is formed at the front end 67 of the container between the skids 62, and a cable connection is provided therein such as a cable connection loop 68 which is positioned within the recess 66. The loop 68 is adapted to receive means such as a hook 69 on the free end 14 of the cable 11. The frame rails 21 are provided with a pair of stop members 70 which engage a pair of abutment members 71 (FIG. 1) positioned on the skids 62 to limit how far the container 15 can be drawn onto the frame 2. The stop members 70 are permanently deployed and positioned to receive the longest container which the mechanism 1 can handle. The frame 2 may also have a pair of deployable stop members 72 positioned to engage abutment members on a shorter size of container such that the container is carried over the axle 18 of the chassis 4 and such that if the container is a dumpable container, refuse is not dumped on the portions of the frame 2. When a full length container 15 is carried, the stop members 72 are placed in such a position that the full length container can be pulled completely onto the frame 2 without interference thereby.

In operation to load a container 15, the truck 5 is backed up to the front end of the container 15, and the frame 2 is tilted up and back until the angled surfaces 42 contact the ground. The hook 69 of the cable 11 is connected to the loop 68, and the lift rams 6 and 7 are extended to thereby move the slide member 8 with the first end 12 of the cable 1 forwardly. Because of the manner in which the cable 11 is reeved about the stationary and movable pulleys 9 and 10, the free end 14 of the cable moves three units of length for each unit of length which the piston ends 38 of the rams 6 and 7 move. When the container 15 has been fully pulled onto the frame 2, the abutments 71 on the skids 62 of the container engage the stop members 70 on the frame 2. At this point, extension of the rams 6 and 7 is halted, and the frame 2 is tilted to horizontal for transport of the container 15. The container 15 is held on the frame 2 by a combination of the tension in the cable 11, the engagement between the abutments 71 and the stop members 70, the flanges 41 on the sides of the lift frame rails 21, and the frictional contact between the container skids 62 and the upper surfaces 40 of the rails 21. The container 15 is off-loaded from the frame 2 essentially by reversing the loading process.

It is to be understood that while certain forms of the present invention have been illustrated and described herein, it is not to be limited to the specific forms or arrangement of parts described and shown.

What is claimed and desired to be secured by Letters Patent is as follows:

1. A roll-off container handling mechanism comprising:
    (a) a truck chassis having a rear end and opposite lateral sides;
    (b) an elongated container lift frame formed of laterally spaced and connected side rails and pivotally connected to said rear end of said chassis; said lift frame including a front end, a rear end, an upper side, and a lower side spaced below said upper side;

(c) a hydraulic frame tilt ram pivotally connected between said chassis and said lift frame;

(d) a stationary pulley having a first lateral axis of rotation mounted on said lift frame with said first axis positioned adjacent said lower side of said lift frame;

(e) a planar slide plate mounted laterally across said lift frame adjacent said upper side and forward of said stationary pulley, extending between said side rails, and movable longitudinally along said lift frame; said plate including a slot formed longitudinally along said slide plate;

(f) a pair of planar shields positioned vertically and in laterally spaced relation on said slide plate along said slot, each of said shields having an outer periphery;

(g) a plurality of bars connected to and extending between said shields at the peripheries thereof;

(h) a movable pulley having a second lateral axis of rotation and mounted on said slide plate in said slot between said shields and within said bars with said second axis positioned adjacent said upper side of said lift frame;

(i) a pair of container lift rams mounted in laterally spaced relation on said lift frame and connected between said lift frame and said slide plate; and (j) a cable having a first end connected to said slide plate; said cable extending rearwardly, being reeved about said stationary pulley from top to bottom, extending forwardly from said stationary pulley, being reeved about said movable pulley from bottom to top, extending rearwardly past said rear end of said chassis, and terminating in a container connector at a second end of said cable.

2. A mechanism as set forth in claim 1 including:
(a) a pair of the hydraulic frame tilt rams positioned in laterally spaced relation and pivotally connected respectively between said lift frame and said chassis.

3. A mechanism as set forth in claim 1 wherein:
(a) each of said lift rams includes at least one hydraulic fluid connector for the communication of hydraulic fluid with said lift ram to thereby extend and retract said lift ram; and
(b) said lift rams are oriented such that the hydraulic connectors are directed laterally.

4. A mechanism as set forth in claim 1 including:
(a) a container abutment positioned on said lift frame and engaged by means on a container connected to said cable upon the container being drawn to a selected position on said lift frame.

5. A mechanism as set forth in claim 1 including:
(a) a stationary pulley support plate extending laterally between said side rails of said lift frame adjacent said lower side, said stationary plate including a stationary slot formed longitudinally therealong;
(b) a pair of planar stationary shields positioned vertically and in laterally spaced relation on said stationary plate along said stationary slot, each of said stationary shields having an outer stationary periphery;
(c) a plurality of stationary bars connected to and extending between said stationary shields at said stationary peripheries; and
(d) said stationary pulley being positioned on said stationary support plate in said stationary slot between said stationary shields and within said stationary bars.

* * * * *